United States Patent
Jeong et al.

(10) Patent No.: US 11,395,323 B2
(45) Date of Patent: Jul. 19, 2022

(54) APPARATUS AND METHOD FOR MANAGING UPLINK CONTROL CHANNELS IN WIRELESS COMMUNICATION SYSTEM

(71) Applicant: Samsung Electronics Co., Ltd., Suwon-si (KR)

(72) Inventors: Youngmin Jeong, Suwon-si (KR); Yunseok Choi, Suwon-si (KR); Hoon Huh, Suwon-si (KR); Jeewoong Kang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 28 days.

(21) Appl. No.: 16/901,557

(22) Filed: Jun. 15, 2020

(65) Prior Publication Data
US 2020/0396761 A1 Dec. 17, 2020

(30) Foreign Application Priority Data
Jun. 14, 2019 (KR) .................. KR10-2019-0071036

(51) Int. Cl.
*H04W 4/00* (2018.01)
*H04W 72/12* (2009.01)
*H04L 5/00* (2006.01)

(52) U.S. Cl.
CPC ......... *H04W 72/1289* (2013.01); *H04L 5/001* (2013.01); *H04L 5/0055* (2013.01)

(58) Field of Classification Search
CPC ......... H04W 72/1289; H04W 72/0453; H04W 24/10; H04L 5/0055; H04L 5/001;
(Continued)

(56) References Cited

U.S. PATENT DOCUMENTS

| 10,182,353 B2 | 1/2019 | Kim et al. |
| 10,411,838 B2 | 9/2019 | Xu et al. |
| 2016/0269931 A1 | 9/2016 | Dinan |
| 2018/0019843 A1 | 1/2018 | Papasakellariou |

(Continued)

FOREIGN PATENT DOCUMENTS

| KR | 10-2013-0134851 A | 12/2013 |
| KR | 10-2016-0093532 A | 8/2016 |

(Continued)

OTHER PUBLICATIONS

LG, "Consideration on carrier aggregation for NR", R1-1719936, Nov. 2017 (From Applicant's IDS) (Year: 2017).*

(Continued)

*Primary Examiner* — Mang Hang Yeung
(74) *Attorney, Agent, or Firm* — Jefferson IP Law, LLP

(57) ABSTRACT

The present disclosure relates to a pre-5$^{th}$-generation (5G) or 5G communication system to be provided for supporting higher data rates Beyond 4$^{th}$-generation (4G) communication system such as long term evolution (LTE). An apparatus and a method for managing uplink control channels in a wireless communication system are provided. The operating method of a base station includes transmitting configuration information for a carrier aggregation (CA) operation using a first carrier and a second carrier, and transmitting a message for activation or deactivation of an uplink control channel in the second carrier based on an electric field strength of a channel with a terminal or a location of the terminal during the CA operation according to the configuration information.

23 Claims, 13 Drawing Sheets

(58) Field of Classification Search
CPC ... H04L 5/0073; H04L 5/0007; H04L 5/0094; H04L 5/0098; H04L 5/0053
USPC .......................................................... 370/330
See application file for complete search history.

(56) References Cited

U.S. PATENT DOCUMENTS

2020/0235891 A1* 7/2020 Lei .................. H04L 1/1822
2020/0275430 A1* 8/2020 Salem ............... H04L 1/1614

FOREIGN PATENT DOCUMENTS

| KR | 10-2016-0113171 A | 9/2016 |
|---|---|---|
| WO | 2018/143785 A1 | 8/2018 |
| WO | 2019/033389 A1 | 2/2019 |

OTHER PUBLICATIONS

LG Electronics, "Considerations on carrier aggregation for NR", 3GPP TSG RAN WG1 Meeting 91, Reno, USA, Nov. 27-Dec. 1, 2017, R1-1719936, Nov. 18, 2017.

Samsung, "Cross-carrier Scheduling with Different Numerologies", 3GPP TSG RAN WG1 #96, Athens, Greece, Feb. 25-Mar. 1, 2019, R1-1902251, Feb. 15, 2019.

ZTE, Sanechips, "PUCCH Transmission in the case of Carrier Aggregation", 3GPP TSG RAN WG1 Meeting 90bis, Prague, CZ, Oct. 9-13, 2017, R1-1717522, Oct. 2, 2017.

Ericsson, "Reduced latency Scell management for NR-NR CA", 3GPP TSG-RAN WG1 Meeting 96, Athens, Greece, Feb. 25-Mar. 1, 2019, R1-1902946, Feb. 16, 2019.

International Search Report dated Sep. 17, 2020, issued in International Application No. PCT/KR2020/007722.

Written Opinion dated Sep. 17, 2020, issued in International Application No. PCT/KR2020/007722.

3rd Generation Partnership Project; Technical Specification Group Radio Access Network; NR; Physical channels and modulation (Release 16), 3GPP TS 38.211 V16.1.0, Mar. 2020.

3rd Generation Partnership Project; Technical Specification Group Radio Access Network; NR; Radio Resource Control (RRC) protocol specification (Release 16); 3GPP TS 38.331 V16.0.0, Mar. 2020.

European Search Report dated Jun. 15, 2022, issued in European Application No. 20822694.4.

* cited by examiner

APPARATUS AND METHOD FOR MANAGING UPLINK CONTROL CHANNELS IN WIRELESS COMMUNICATION SYSTEM

CROSS-REFERENCE TO RELATED APPLICATION(S)

This application is based on and claims priority under 35 U.S.C. § 119(a) of a Korean patent application number 10-2019-0071036, filed on Jun. 14, 2019, in the Korean Intellectual Property Office, the disclosure of which is incorporated by reference herein in its entirety.

BACKGROUND

1. Field

The disclosure relates generally to a wireless communication system. More particularly, the disclosure relates to an apparatus and a method for managing uplink control channels in a wireless communication system.

2. Description of Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

A carrier aggregation (CA) technique, introduced in a long term evolution-advanced (LTE-A) system, supports transmission/reception of data using multiple carriers. Data throughput may be increased according to the number of used carriers via CA. A fifth-generation (5G) system may be operated in a wider frequency range, and thus it will be beneficial to consider various matters in applying the CA technique to the 5G system.

The above information is presented as background information only to assist with an understanding of the disclosure. No determination has been made, and no assertion is made, as to whether any of the above might be applicable as prior art with regard to the disclosure.

SUMMARY

Aspects the disclosure are to address at least the above-mentioned problems and/or disadvantages and to provide at least the advantages described below. Accordingly, an aspect of the disclosure is to provide an apparatus and a method for managing uplink control channels in a wireless communication system.

Another aspect of the disclosure is to provide an apparatus and a method for selectively using uplink control channels in carriers for a carrier aggregation (CA) operation in a wireless communication system.

Another aspect of the disclosure is to provide an apparatus and a method for selectively using an uplink control channel according to a situation in a wireless communication system.

Another aspect of the disclosure is to provide an apparatus and a method for addressing coverage reduction due to an uplink control channel during a CA operation in a wireless communication system.

Additional aspects will be set forth in part in the description which follows and, in part, will be apparent from the description, or may be learned by practice of the presented embodiments.

In accordance with an aspect of the disclosure, a method for operating a base station in a wireless communication system is provided. The method includes transmitting configuration information for a CA operation using a first carrier and a second carrier, and transmitting a message for activation or deactivation of an uplink control channel in the second carrier based on an electric field strength of a channel with a terminal or a location of the terminal during the CA operation according to the configuration information.

In accordance with another aspect of the disclosure, a method for operating a terminal in a wireless communication system is provided. The method includes receiving configuration information for a CA operation using a first carrier and a second carrier, and receiving a message for activation or deactivation of an uplink control channel in the second carrier based on an electric field strength of a channel with a terminal or a location of the terminal during the CA operation according to the configuration information.

In accordance with another aspect of the disclosure, a base station in a wireless communication system is provided. The base station includes a transceiver, and at least one processor operatively coupled to the transceiver, wherein the at least one processor is configured to control to transmit configuration information for a CA operation using a first carrier and a second carrier, and transmit a message for activation or deactivation of an uplink control channel in the second carrier based on an electric field strength of a channel with a terminal or a location of the terminal during the CA operation according to the configuration information.

In accordance with another aspect of the disclosure, a terminal in a wireless communication system is provided. The terminal includes a transceiver, and at least one processor operatively coupled to the transceiver, wherein the at least one processor is configured to control to receive configuration information for a CA operation using a first carrier and a second carrier, and receive a message for activation or deactivation of an uplink control channel in the second carrier based on an electric field strength of a channel with a terminal or a location of the terminal during the CA operation according to the configuration information.

An apparatus and a method according to various embodiments can mitigate coverage limitation due to an uplink control channel during a CA operation.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
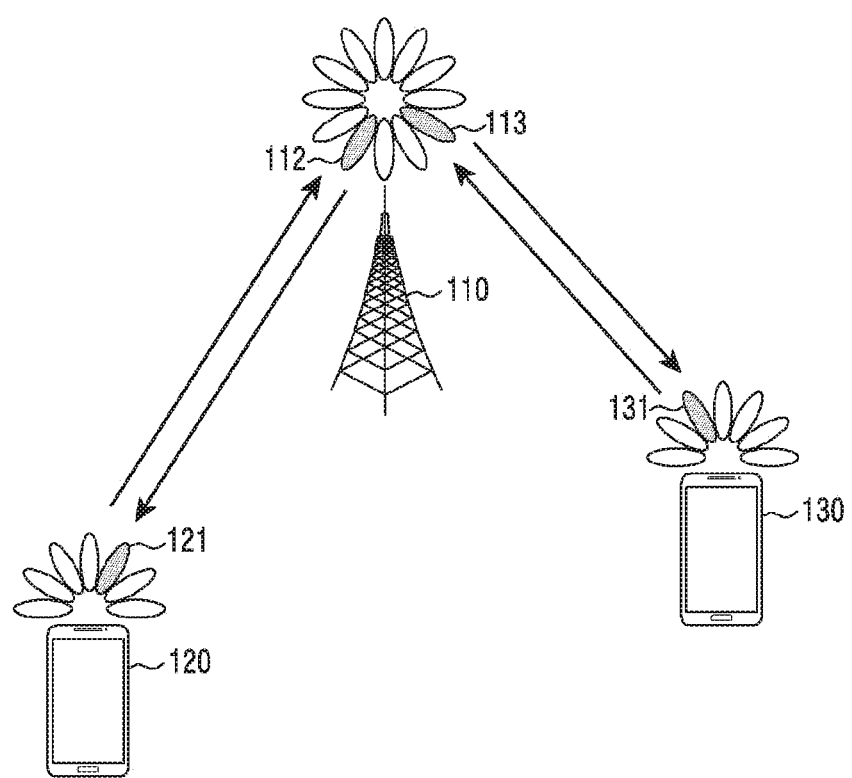
FIG. 1 is a view illustrating a wireless communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, various embodiments of the disclosure will be described based on an approach of hardware. However, various embodiments of the disclosure include a technology that uses both hardware and software, and thus the various embodiments of the disclosure may not exclude the perspective of software.

Hereinafter, the disclosure relates to an apparatus and a method for managing uplink control channels in a wireless communication system. Specifically, the disclosure will describe technology for selectively using at least one uplink control channel during a carrier aggregation (CA) operation in a wireless communication system.

In the following description, terms, used to refer to: signals; channels; control information; network entities; elements of an apparatus; a state of a channel (e.g., activated or deactivated); and the like, are provided as examples for convenience of description. Accordingly, the disclosure is not limited to the following terms, and other terms having equivalent technical meanings may be used.

Further, in the disclosure, in order to determine whether a particular condition is satisfied or fulfilled, the expression "greater than" or "less than" is used, but this expression is only a description for expressing an example, and thus does not exclude the description "greater than or equal to" or "less than or equal to". A condition described by the expression "greater than or equal to" can be replaced by a condition described by the expression "greater than". A condition described by the expression "less than or equal to" can be replaced by a condition described by the expression "less than". A condition described by the expressions "greater than or equal to" and "less than" can be replaced by a condition described by the expressions "greater than" and "less than or equal to".

Further, in the disclosure, various embodiments are described using the terms used in some communication standards (e.g., third generation partnership project (3GPP)), but this configuration is only an example for description. Various embodiments may also be easily modified and applied to another communication system.

FIG. 1 is a view illustrating a wireless communication system according to an embodiment of the disclosure.

FIG. 1 illustrates an example of a base station 110, a terminal 120, and a terminal 130 as some of nodes using a wireless channel in the wireless communication system.

FIG. 1 illustrates only one base station, but may further include another base station identical or similar to the base station 110.

The base station 110 is a network infrastructure which provides radio access to the terminals 120 and 130. The base station 110 has a coverage defined by a predetermined geographic area based on the distance over which a signal can be transmitted. The base station 110 may be referred to as an "access point (AP)", an "eNodeB (eNB)", a "fifth-generation node (5G node)", a "next-generation nodeB (gNB)", a "wireless point", a "transmission/reception point (TRP)", or other terms having equivalent technical meanings.

Each of the terminals 120 and 130 is an apparatus used by a user, and communicates with the base station 110 via a wireless channel. In some cases, at least one of the terminals 120 or 130 may be operated without user involvement. That is, at least one of the terminals 120 or 130 is an apparatus that performs machine-type communication (MTC), and may not be carried by a user. Each of the terminals 120 and 130 may be referred to as a "user equipment (UE)", a "mobile station", a "subscriber station", a "remote terminal", a "wireless terminal", a "user device", or other terms having equivalent technical meanings.

The base station 110 and the terminals 120 and 130 may transmit and receive radio signals in a millimeter wave (mmWave) band (e.g., 28 GHz, 30 GHz, 38 GHz, or 60 GHz). In this example, in order to improve a channel gain, the base station 110 and the terminals 120 and 130 may perform beamforming. In this example, the beamforming may include transmission beamforming and reception beamforming. That is, the base station 110 and the terminals 120 and 130 may assign directivity to a transmission signal or a reception signal. To this end, the base station 110 and the terminals 120 and 130 may select serving beams 112, 113, 121, and 131 via a beam search procedure or a beam management procedure. After the serving beams 112, 113, 121, and 131 are selected, subsequent communication may be performed on a resource in a quasi-co-located (QCL) relationship with a resource for transmission of the serving beams 112, 113, 121, and 131.

When large-scale properties of a channel, via which a symbol on a first antenna port has been delivered, can be inferred from a channel via which a symbol on a second antenna port has been delivered, the first antenna port and the second antenna port may be considered to have a QCL relationship. For example, the large-scale properties may include at least one of a delay spread, a Doppler spread, a Doppler shift, an average gain, an average delay, or a spatial receiver parameter.

Figure 2:
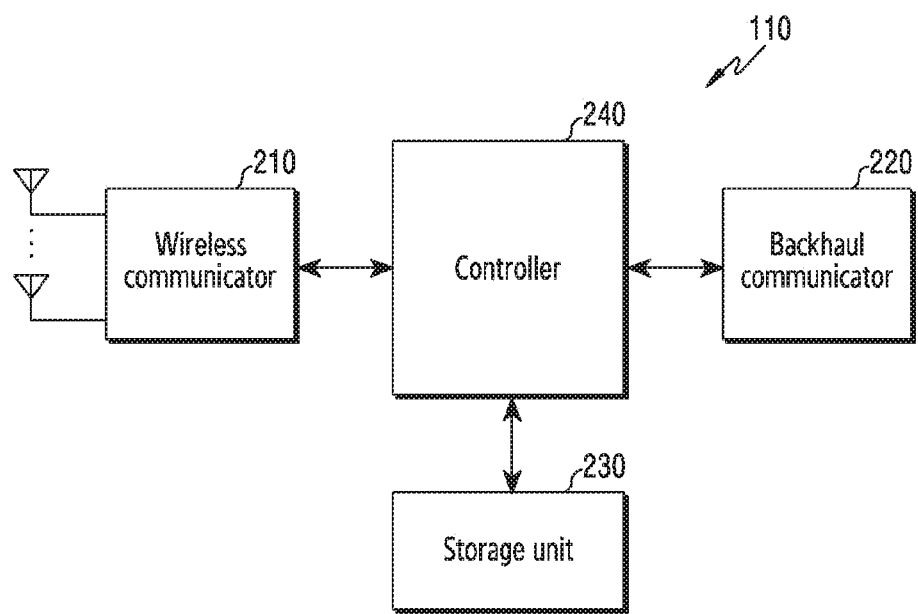
FIG. 2 is a block diagram illustrating a configuration of a base station in a wireless communication system according to an embodiment of the disclosure.

FIG. 2 is a block diagram illustrating a configuration of a base station in a wireless communication system according to an embodiment of the disclosure.

The configuration exemplified in FIG. 2 may be understood as a configuration of the base station 110. The term " . . . unit", the term ending with the suffix " . . . or" or " . . . er", or the like, which is used below, may refer to a unit for processing at least one function or operation, and this configuration may be implemented in hardware, software, or a combination of hardware and software.

Referring to FIG. 2, the base station 110 may include a wireless communicator 210, a backhaul communicator 220, a storage unit 230, and a controller 240.

The wireless communicator 210 is configured to perform functions of transmitting or receiving a signal via a wireless channel. For example, the wireless communicator 210 is configured to perform a function of conversion between a baseband signal and a bit stream according to a physical layer standard of the system. For example, the wireless communicator 210 is configured to, when data is transmitted, generate complex symbols by encoding and modulating a transmission bit stream. Also, the wireless communicator 210 is configured to, when data is received, reconstruct a reception bit stream by demodulating and decoding a baseband signal.

Further, the wireless communicator 210 is configured to up-convert a baseband signal into a radio frequency (RF) band signal and then transmit the RF band signal via an antenna, and is configured to down-convert an RF band signal received via the antenna into a baseband signal. To this end, the wireless communicator 210 may include a transmission filter, a reception filter, an amplifier, a mixer, an oscillator, a digital-to-analog converter (DAC), an analog-to-digital converter (ADC), and the like. Also, the wireless communicator 210 may include multiple transmission/reception paths. Further, the wireless communicator 210 may include at least one antenna array including multiple antenna elements.

In terms of hardware, the wireless communicator 210 may include a digital unit and an analog unit, and the analog unit may include multiple sub-units according to operating power, an operating frequency, and the like. The digital unit may be implemented by at least one processor (e.g., a digital signal processor (DSP)).

As described above, the wireless communicator 210 transmits and receives signals. Accordingly, the entirety or part of the wireless communicator 210 may be referred to as a "transmitter", a "receiver", or a "transceiver". Also, in the following description, transmission and reception performed via a wireless channel is used in the sense of including the execution of the above-described processing by the wireless communicator 210.

The backhaul communicator 220 is configured to provide an interface configured to perform communication with other nodes within a network. That is, the backhaul communicator 220 is configured to convert a bit stream transmitted from the base station to another node, for example, another access node, another base station, an upper node, or a core network, into a physical signal, and is configured to convert a physical signal received from another node into a bit stream.

The storage unit 230 is configured to store data, such as a basic program, an application program, and configuration information for operation of the base station. The storage unit 230 may be implemented by a volatile memory, a non-volatile memory, or a combination of a volatile memory and a non-volatile memory. Also, the storage unit 230 is configured to provide stored data in response to a request of the controller 240.

The controller 240 is configured to control an overall operation of the base station. For example, the controller 240 is configured to transmit and receive signals via the wireless communicator 210 or via the backhaul communicator 220. Also, the controller 240 is configured to record data in the storage unit 230 and read the recorded data therefrom. Further, the controller 240 may be configured to perform functions of a protocol stack required by a communication standard. According to another implementation example, the wireless communicator 210 may include the protocol stack. To this end, the controller 240 may include at least one processor. According to various embodiments, the controller 240 may control the base station to perform operations according to various embodiments described below.

Figure 3:
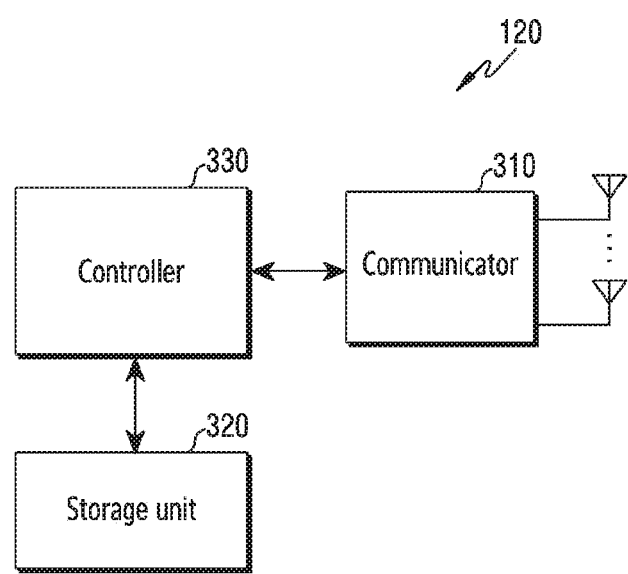
FIG. 3 is a block diagram illustrating a configuration of a terminal in a wireless communication system according to an embodiment of the disclosure.

FIG. 3 is a block diagram illustrating a configuration of a terminal in a wireless communication system according to an embodiment of the disclosure.

The configuration exemplified in FIG. 3 may be understood as a configuration of the terminal 120. The term " . . . unit", the term ending with the suffix " . . . or" or " . . . er", or the like, which is used below, may refer to a unit for processing at least one function or operation, and this configuration may be implemented in hardware, software, or a combination of hardware and software.

Referring to FIG. 3, the terminal includes a communicator 310, a storage unit 320, and a controller 330.

The communicator 310 is configured to perform functions of transmitting or receiving a signal via a wireless channel. For example, the communicator 310 is configured to perform a function of conversion between a baseband signal and a bit stream according to a physical layer standard of the system. For example, the communicator 310 is configured to, when data is transmitted, generate complex symbols by encoding and modulating a transmission bit stream. Also, the communicator 310 is configured to, when data is received, reconstruct a reception bit stream by demodulating and decoding a baseband signal. Further, the communicator 310 is configured to up-convert a baseband signal into an RF band signal and then transmit the RF band signal via an antenna, and is configured to down-convert an RF band signal received via the antenna into a baseband signal. For example, the communicator 310 may include a transmission filter, a reception filter, an amplifier, a mixer, an oscillator, a DAC, an ADC, and the like.

Also, the communicator 310 may include multiple transmission/reception paths. Further, the communicator 310 may include at least one antenna array including multiple antenna elements. In terms of hardware, the communicator 310 may include a digital circuit and an analog circuit (e.g., a radio frequency integrated circuit (RFIC)). In this example, the digital circuit and the analog circuit may be implemented as one package. Also, the communicator 310 may include multiple RF chains. Further, the communicator 310 may perform beamforming.

In addition, the communicator 310 may include different communication modules in order to process signals in different frequency bands. Further, the communicator 310 may include multiple communication modules in order to support multiple different radio access technologies. For example, the different radio access technologies may include Bluetooth low energy (BLE), Wi-Fi, Wi-Fi gigabyte (WiGig), a cellular network (e.g., long-term evolution (LTE)), and the like. Also, the different frequency bands may include a super-high frequency (SHF) band (e.g., 2.5 GHz or 5 GHz) and a mmWave band (e.g., 60 GHz).

As described above, the communicator 310 transmits and receives signals. Accordingly, the entirety or part of the communicator 310 may be referred to as a "transmitter", a "receiver", or a "transceiver". Also, in the following description, transmission and reception performed via a wireless channel is used in the sense of including the execution of the above-described processing by the communicator 310.

The storage unit 320 is configured to store data, such as a basic program, an application program, and configuration information for operation of the terminal. The storage unit 320 may be implemented by a volatile memory, a non-volatile memory, or a combination of a volatile memory and a non-volatile memory. Also, the storage unit 320 is configured to provide stored data in response to a request of the controller 330.

The controller 330 is configured to control an overall operation of the terminal. For example, the controller 330 is configured to transmit and receive signals via the communicator 310. Also, the controller 330 is configured to record data in the storage unit 320 and read the recorded data therefrom. Further, the controller 330 may be configured to perform functions of a protocol stack required by a communication standard. To this end, the controller 330 may include at least one processor or a microprocessor, or may be a part of a processor. In addition, the controller 330 and a part of the communicator 310 may be referred to as a "communication processor (CP)". According to various embodiments, the controller 330 may control the terminal to perform operations according to various embodiments described below.

Figure 4:
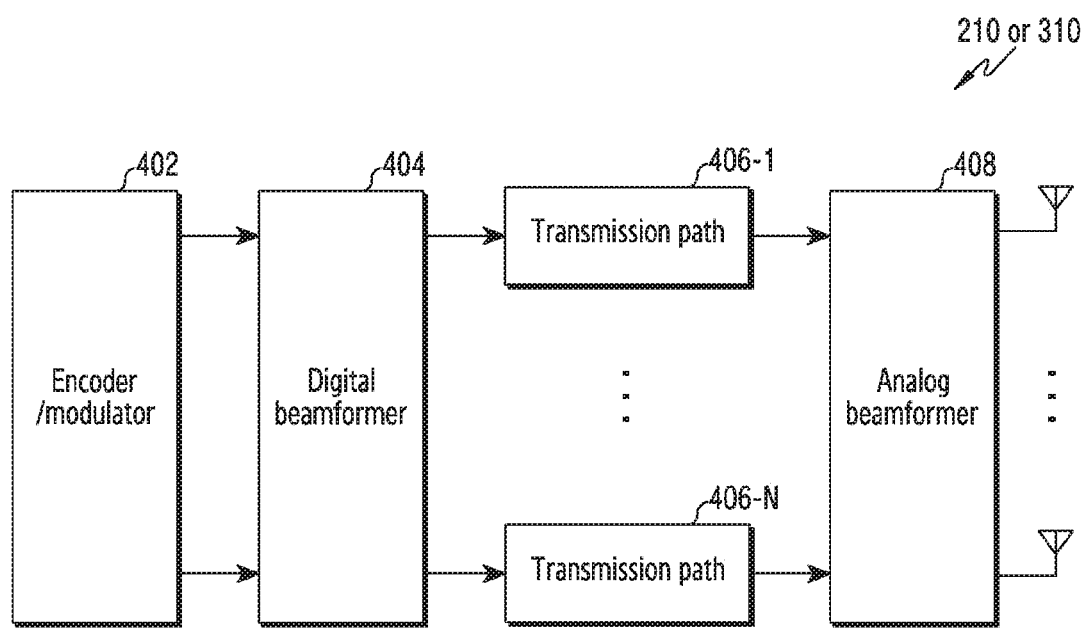
FIG. 4 is a block diagram illustrating a configuration of a communicator in a wireless communication system according to an embodiment of the disclosure.

FIG. 4 is a block diagram illustrating a configuration of a communicator in a wireless communication system according to an embodiment of the disclosure.

FIG. 4 illustrates an example of a specific configuration of the wireless communicator 210 of FIG. 2 or the communicator 310 of FIG. 3. Specifically, FIG. 4 illustrates a part of the wireless communicator 210 of FIG. 2 or the communicator 310 of FIG. 3, and illustrates an example of elements configured to perform beamforming.

Referring to FIG. 4, the wireless communicator 210 or the communicator 310 includes an encoder/modulator 402, a digital beamformer 404, multiple transmission paths 406-1 to 406-N, and an analog beamformer 408.

The encoder/modulator 402 performs channel encoding. At least one of a low-density parity-check (LDPC) code, a convolution code, or a polar code may be used for channel encoding. The encoder/modulator 402 generates modulation symbols by performing constellation mapping. The digital beamformer 404 performs beamforming for a digital signal (e.g., modulation symbols). To this end, the digital beamformer 404 multiplies the modulation symbols by beamforming weights. In this example, the beamforming weights are used to change the magnitude and phrase of the signal, and may be referred to as a "precoding matrix", a "precoder", or the like. The digital beamformer 404 outputs the digitally-beamformed modulation symbols to the multiple transmission paths 406-1 to 406-N. In this example, according to a multiple-input multiple-output (MIMO) transmission technique, the modulation symbols may be multiplexed, or the same modulation symbol may be provided to each of the multiple transmission paths 406-1 to 406-N.

The multiple transmission paths 406-1 to 406-N convert the digitally-beamformed digital signals into analog signals. To this end, each of the multiple transmission paths 406-1 to 406-N may include an inverse fast Fourier transform (IFFT) calculator, a cyclic-prefix (CP) inserter, a DAC, and an up-converter. The CP inserter is for an orthogonal frequency division multiplexing (OFDM) scheme, and may be omitted when another physical layer scheme (e.g., a filter bank multi-carrier (FBMC)) is applied. That is, the multiple transmission paths 406-1 to 406-N provide independent signal processing procedures for multiple streams generated via the digital beamforming. However, according to an implementation scheme, some of the elements of the multiple transmission paths 406-1 to 406-N may be used in common.

The analog beamformer 408 performs beamforming for an analog signal. To this end, the digital beamformer 404 multiplies the analog signals by beamforming weights. In this example, the beamforming weights are used to change at least one of magnitude or phrase of the signal. Specifically, the analog beamformer 408 may be variously configured according to connection structures between the multiple transmission paths 406-1 to 406-N and the antennas. For example, each of the multiple transmission paths 406-1 to 406-N may be connected to one antenna array. As another example, the multiple transmission paths 406-1 to 406-N may be connected to one antenna array. As still another example, the multiple transmission paths 406-1 to 406-N may be adaptively connected to one antenna array or at least two antenna arrays.

According to embodiments in the present disclosure, a base station in a wireless communication system, the method comprises transmitting configuration information for a carrier aggregation (CA) operation using a first carrier and a second carrier; and transmitting a message for activation or deactivation of an uplink control channel in the second carrier based on an electric field strength of a channel with a terminal or a location of the terminal during the CA operation according to the configuration information.

In some embodiments, the message comprises information on mapping of a resource of an uplink control channel corresponding to a downlink data channel in the second carrier.

In some embodiments, wherein the message comprises at least one piece of information among: information on addition or release of a resource or a resource set of the uplink control channel in the second carrier; information on a format of the uplink control channel in the second carrier; information on a downlink data channel corresponding to the uplink control channel in the second carrier; an indicator for indicating switching of a state of the uplink control channel in the second carrier; or information indicating a carrier to which another uplink control channel to be alternatively used belongs.

In some embodiments, the first carrier has a frequency lower than a frequency of the second carrier, and the first carrier has a slot length greater than a slot length of the second carrier.

In some embodiments, the uplink control channel in the second carrier is activated when the terminal is located in a coverage of the uplink control channel in the second carrier, and the uplink control channel in the second carrier is deactivated when the terminal is located outside the coverage of the uplink control channel in the second carrier.

In some embodiments, the method further comprises determining whether to switch a state of the uplink control channel in the second carrier, based on at least one of a measurement report received from the terminal, an uplink data transmission rate, or an error rate of uplink control information.

In some embodiments, the method further comprises determining whether to switch a state of the uplink control channel in the second carrier, based on the location of the terminal or a distance between the base station and the terminal.

According to embodiments in the present disclosure, a method for operating a terminal in a wireless communication system, the method comprises receiving configuration information for a carrier aggregation (CA) operation using a first carrier and a second carrier; and receiving a message for activation or deactivation of an uplink control channel in the second carrier based on an electric field strength of a channel with a terminal or a location of the terminal during the CA operation according to the configuration information.

In some embodiments, the message comprises information on mapping of a resource of an uplink control channel corresponding to a downlink data channel in the second carrier.

In some embodiments, the message comprises at least one piece of information among: information on addition or release of a resource or a resource set of the uplink control channel in the second carrier; information on a format of the uplink control channel in the second carrier; information on a downlink data channel corresponding to the uplink control channel in the second carrier; an indicator for indicating switching of a state of the uplink control channel in the second carrier; or information indicating a carrier to which another uplink control channel to be alternatively used belongs.

In some embodiments, the first carrier has a frequency lower than a frequency of the second carrier, and the first carrier has a slot length greater than a slot length of the second carrier.

In some embodiments, the uplink control channel in the second carrier is activated when the terminal is located in a coverage of the uplink control channel in the second carrier, and the uplink control channel in the second carrier is deactivated when the terminal is located outside the coverage of the uplink control channel in the second carrier.

According to embodiments in the present disclosure, a base station in a wireless communication system, the base station comprising: a transceiver; and at least one processor operatively coupled to the transceiver, wherein the at least one processor is configured to control to: transmit configuration information for a carrier aggregation (CA) operation using a first carrier and a second carrier, and transmit a message for activation or deactivation of an uplink control channel in the second carrier based on an electric field strength of a channel with a terminal or a location of the terminal during the CA operation according to the configuration information.

In some embodiments, the message comprises at least one piece of information among: information on mapping of a resource of an uplink control channel corresponding to a downlink data channel in the second carrier; information on addition or release of a resource or a resource set of the uplink control channel in the second carrier; information on a format of the uplink control channel in the second carrier; information on a downlink data channel corresponding to the uplink control channel in the second carrier; an indicator for indicating switching of a state of the uplink control channel in the second carrier; or information indicating a carrier to which another uplink control channel to be alternatively used belongs.

In some embodiments, the uplink control channel in the second carrier is activated when the terminal is located in a coverage of the uplink control channel in the second carrier, and the uplink control channel in the second carrier is deactivated when the terminal is located outside the coverage of the uplink control channel in the second carrier.

In some embodiments, the at least one processor is further configured to determine whether to switch a state of the uplink control channel in the second carrier, based on at least one of a measurement report received from the terminal, an uplink data transmission rate, or an error rate of uplink control information.

According to embodiments in the present disclosure, a terminal in a wireless communication system, the terminal comprises a transceiver; and at least one processor operatively coupled to the transceiver. The at least one processor is configured to control to: receive configuration information for a carrier aggregation (CA) operation using a first carrier and a second carrier, and receive a message for activation or deactivation of an uplink control channel in the second carrier based on an electric field strength of a channel with a terminal or a location of the terminal during the CA operation according to the configuration information.

In some embodiments, the message comprises at least one piece of information among: information on mapping of a resource of an uplink control channel corresponding to a downlink data channel in the second carrier; information on addition or release of a resource or a resource set of the uplink control channel in the second carrier; information on a format of the uplink control channel in the second carrier; information on a downlink data channel corresponding to the uplink control channel in the second carrier; an indicator for indicating switching of a state of the uplink control channel in the second carrier; or information indicating a carrier to which another uplink control channel to be alternatively used belongs.

In some embodiments, the first carrier has a frequency lower than a frequency of the second carrier, and the first carrier has a slot length greater than a slot length of the second carrier.

In some embodiments, the uplink control channel in the second carrier is activated when the terminal is located in a coverage of the uplink control channel in the second carrier, and the uplink control channel in the second carrier is deactivated when the terminal is located outside the coverage of the uplink control channel in the second carrier.

A wireless communication system according to various embodiments supports a CA technique. A base station and a terminal may communicate with each other on multiple carriers via a CA operation. Carriers for a CA operation may have at least one frequency band among multiple bands available in the wireless communication system. The multiple available bands may belong to multiple frequency ranges (FRs) classified according to frequency characteristics. For example, FRs may be referred to as "FR1 and FR2". Specifically, FR1 may refer to an FR less than or equal to a threshold, and FR2 may refer to an FR greater than or equal to the threshold. As an example, the threshold may be 6 GHz or 7.125 GHz. FR2 may include an SHF (mmWave) band. In the following description, FR1 and FR2 may be referred to as a "low-frequency range/first FR/first range/low-frequency band/first FR/first band" and a "high-frequency range/second FR/second range/high-frequency band/second FR/second band", respectively.

As described above, requirements throughout the RF specifications are in many cases defined separately for different frequency ranges (FR). In some embodiments, the frequency ranges in which NR can operate according to this version of the specification are identified as described in Table 1.

TABLE 1

| Frequency range designation | Corresponding frequency range |
| --- | --- |
| FR1 | 410 MHz-7125 MHz |
| FR2 | 24250 MHz-52600 MHz |

When a carrier in a high-frequency band is used, a coverage may be relatively small. For example, when a primary cell is configured in a low-frequency band and a secondary cell is configured in a high-frequency band, the primary cell has a coverage greater than a coverage of the secondary cell. Further, when a small subcarrier spacing (SCS) is applied to the primary cell and a large SCS is applied to the secondary cell, the primary cell has a slot length greater than a slot length of the secondary cell.

In the present disclosure, the subcarrier spacing (SCS) and the slot length can be referred as a numerology. The numerology may be represented by the parameter μ. Multiple OFDM numerologies are supported as given by Table 42. μ and the cyclic prefix for a bandwidth part are obtained from the higher-layer parameter.

TABLE 2

Supported transmission numerologies.

| μ | $\Delta f = 2^\mu \cdot 15$ [kHz] | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |

Each of the primary cell and the secondary cell may include at least one of a downlink data channel, an uplink data channel, a downlink control channel, or an uplink control channel. In this example, the downlink data channel may be referred to as a "physical data shared channel (PDSCH)", and the uplink data channel may be referred to as a "physical uplink control channel (PUCCH)". Acknowledge (ACK) information for data, transmitted via the downlink data channel, may be transmitted via the uplink control channel, and in this example, a carrier used to deliver the data does not have to be identical to a carrier used to feed back the ACK.

In the present disclosure, the carrier frequency refers to a cell and may be used to refer to the center frequency of the cell. For example, in case of CA, the primary cell is described as a primary carrier and the secondary cell is described as the secondary carrier.

Combinations of the used channels may be identical to, or different from, each other in the primary cell and the secondary cell. A coverage, in which a CA operation can be performed, may be changed according to which channels are used in the primary cell and the secondary cell. That is, when multiple channels are used, an entire coverage is limited by a channel having the smallest coverage. A coverage becomes larger in the order of an uplink control channel in FR2, a downlink data channel in FR2, an uplink control channel in FR1, and an uplink data channel in FR1. This is because signal attenuation becomes larger as a frequency becomes higher and transmission power of a base station is greater than transmission power of a terminal. This is because an uplink signal transmitted by the terminal has power which is relatively largely limited. Accordingly, when an uplink control channel is used in both FR1 and FR2, the entire coverage is limited by an uplink control channel in FR2. Hereinafter, FIGS. 5A and 5B illustrate specific examples of coverages according to whether an uplink control channel is used.

Figure 5A:
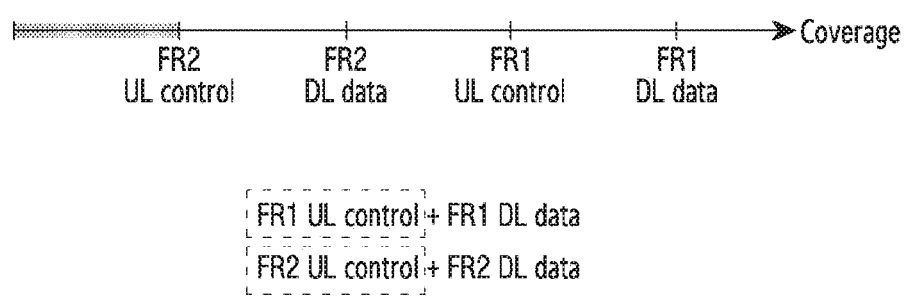
FIG. 5A is a view illustrating an example of a coverage in a case where an uplink control channel is used for each carrier in a wireless communication system according to an embodiment of the disclosure.
Figure 5B:
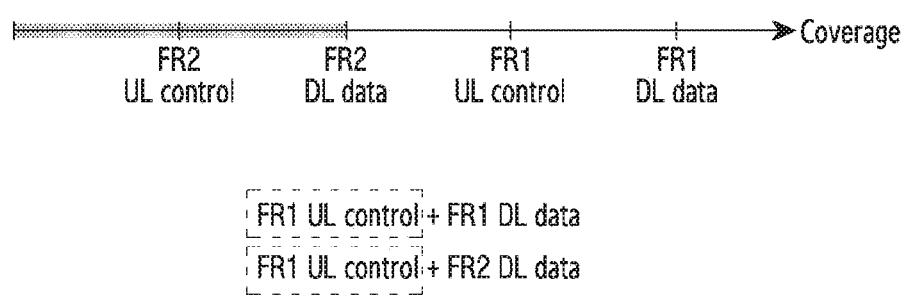
FIG. 5B is a view illustrating an example of a coverage in a case where an uplink control channel is shared between carriers in a wireless communication system according to an embodiment of the disclosure.

FIG. 5A is a view illustrating an example of a coverage in a case where an uplink control channel is used for each carrier in a wireless communication system according to an embodiment of the disclosure.

FIG. 5A illustrates an example in which two uplink control channels are operated when an uplink control channel is operated for each carrier, that is, during a CA operation using two carriers.

Referring to FIG. 5A, an uplink control channel and a downlink data channel are used in FR1, and an uplink control channel and a downlink data channel are used in FR2. In this example, hybrid automatic repeat request (HARQ) acknowledge/negative acknowledge (ACK/NACK) information for downlink data in FR2 is transmitted via the uplink control channel in FR2, and HARQ ACK/NACK information for downlink data in FR1 is transmitted via the uplink control channel in FR1. Accordingly, a downlink data transmission coverage of FR2 is limited to the uplink control channel in FR2, and thus is less than in the case of FIG. 5B. In contrast, since frequency band-specific uplink control channels for data transmission are separately operated, a downlink performance degradation phenomenon described below can be suppressed.

FIG. 5B is a view illustrating an example of a coverage in a case where an uplink control channel is shared between carriers in a wireless communication system according to an embodiment of the disclosure.

FIG. 5B illustrates an example in which an uplink control channel is operated only in FR1 when one uplink control channel is operated between carriers, that is, during a CA operation using two carriers.

Referring to FIG. 5B, an uplink control channel and a downlink data channel are used in FR1, and a downlink data channel is used in FR2. In this example, HARQ ACK/NACK information for downlink data in FR2 is transmitted via the uplink control channel in FR1, and HARQ ACK/NACK information for downlink data in FR1 is also transmitted via the uplink control channel in FR1. Accordingly, a downlink data transmission coverage of FR2 is not limited to an uplink control channel in FR2, but an entire coverage is extended to a coverage of the uplink control channel in FR1. However, since a frequency band-specific uplink control channel for data transmission is shared in FR1 and FR2, a downlink performance degradation phenomenon may occur as described below with reference to FIG. 6.

Figure 6:
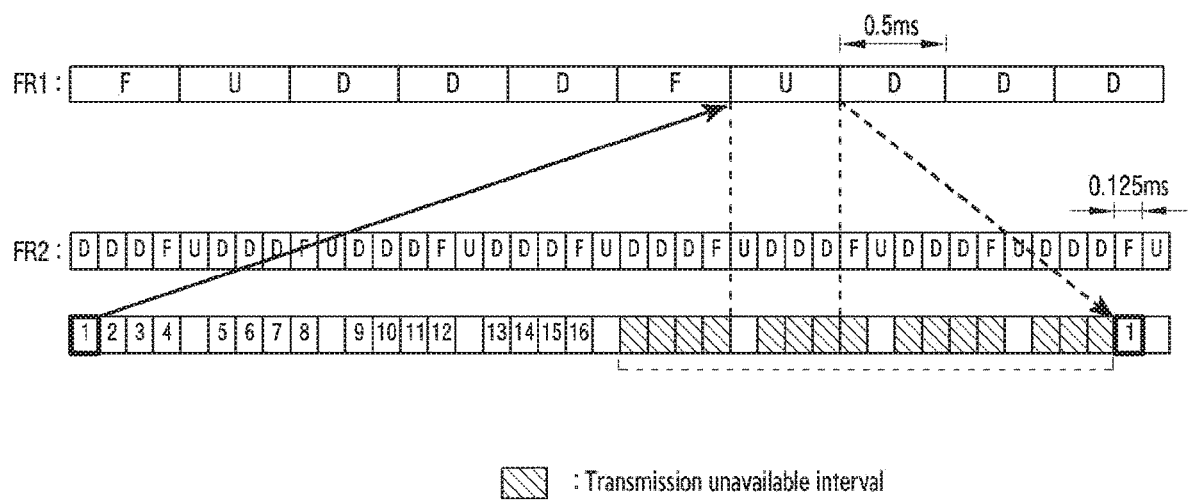
FIG. 6 is a view illustrating an example of a downlink performance degradation due to a difference between slot lengths in a wireless communication system according to an embodiment of the disclosure.

FIG. 6 is a view illustrating an example of a downlink performance degradation due to a difference between slot lengths in a wireless communication system according to an embodiment of the disclosure.

Referring to FIG. 6, different SCSs are applied to FR1 and FR2, and accordingly, respective slot lengths are different. For example, an SCS in FR1 is 30 kHz, and an SCS in FR2 is 120 kHz. Accordingly, a slot length (e.g., 0.5 ms) in FR1 is about four times greater than a slot length (e.g., 0.125 ms) in FR2. In this configuration, a time division duplex (TDD) scheme is employed, and a pattern, in which a flexible (F) slot, a downlink (D) slot, and an uplink (U) slot are configured, is used.

HARQ process is used in NR communication system. The MAC entity includes a HARQ entity for each Serving Cell, which maintains a number of parallel HARQ processes. Each HARQ process is associated with a HARQ process identifier. The HARQ process ID is included in HARQ information. The HARQ information for DL-SCH, for UL-SCH, or for SL-SCH transmissions consists of New Data Indicator (NDI), Transport Block size (TBS), Redundancy Version (RV), and HARQ process ID.

The number of parallel DL HARQ processes per HARQ entity can be predefined. For example, in downlink, a maximum of 16 HARQ processes per cell is supported by the UE. The number of processes the UE may assume will at most be used for the downlink is configured to the UE for each cell separately by higher layer parameter nrofHARQ-ProcessesForPDSCH (defined in 3GPP TS 38.331), and when no configuration is provided the UE may assume a default number of 8 processes.

ACK/NACK information for downlink data may not be transmitted until an uplink interval (e.g., a slot) arrives. ACK/NACK information for downlink data in FR2 may be transmitted via FR1, and due to the difference between slot lengths in FR1 and FR2, the number of downlink data in FR2 transmitted until an uplink interval in FR1 arrives may be greater than the maximum number (e.g., 16) of available HARQ process identifiers (IDs). In this example, as illustrated in FIG. 6, feedback of ACK/NACK information may be delayed until all the HARQ process IDs are used, and finally, data transmission may be stopped in some downlink intervals (e.g., a transmission unavailable interval of FIG. 6) in FR2. This phenomenon causes a downlink throughput degradation.

As described above, if an uplink control channel is operated for each carrier during a CA operation using at least two carriers having different coverages and having different SCSs or slot lengths, a downlink throughput degradation can be prevented, but a downlink data transmission coverage may be limited by an uplink control channel used in a high-frequency band. In contrast, when only an uplink control channel in a carrier at a low frequency is operated, a coverage becomes larger, but a downlink throughput degradation may occur due to a HARQ round-trip-time (RTT) difference.

Therefore, the disclosure provides various embodiments of adaptively using an uplink control channel according to a situation. In the above description, an example of use of two carriers belonging to different FRs has been described, but the embodiments described herein may be practiced even when at least three carriers are used or even in the case of a CA operation using carriers belonging to the same FR.

Figure 7:
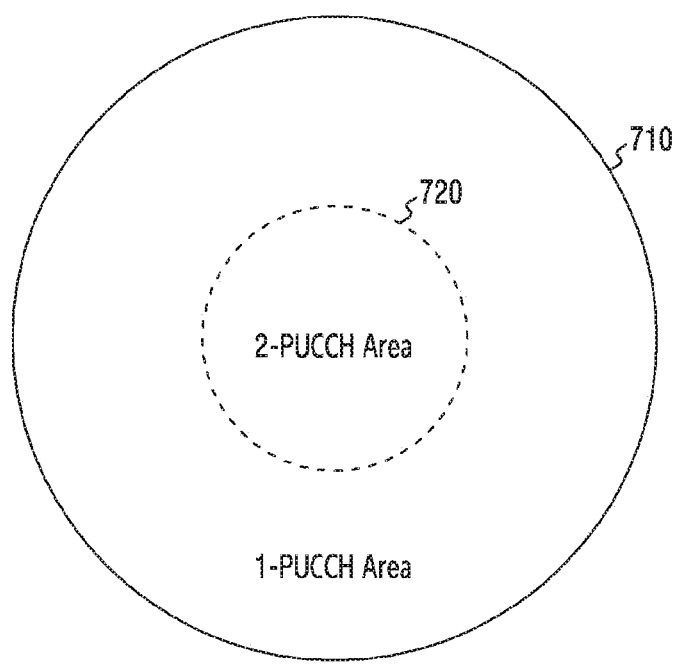
FIG. 7 is a view illustrating an example of a use state of an uplink control channel for each area in a wireless communication system according to an embodiment of the disclosure.

FIG. 7 is a view illustrating an example of a use state of an uplink control channel for each area in a wireless communication system according to an embodiment of the disclosure.

Referring to FIG. 7, a coverage of a base station is divided into two areas 710 and 720. The first area 710 is a coverage in a case where an uplink control channel is not used in a second carrier belonging to a high-frequency range, and the second area 720 is a coverage in a case where the uplink control channel is used in the second carrier belonging to the high-frequency range. Accordingly, it is possible to obtain all advantages of improving downlink throughput and extending a coverage by activating/deactivating the uplink control channel in the second carrier according to which area a terminal is located at. Therefore, the first area 710 may be referred to as a "2-PUCCH area", and the second area 720 may be referred to as a "1-PUCCH area".

When the terminal is located in the second area 720, the base station may activate the uplink control channel in the second carrier, and thus may control to transmit, on the second carrier, ACK/NACK information for downlink data of the second carrier. Further, when the terminal is located outside the second area 720, the base station may deactivate the uplink control channel in the second carrier, may allow sharing of an uplink control channel in a first carrier, and thus may control to transmit, on the first carrier, ACK/NACK information for downlink data of the second carrier. Control of the uplink control channel in the second carrier, that is, switching of the number of activated uplink control channels, is performed at a boundary between the first area 710 and the second area 720. Accordingly, the base station can achieve higher throughput in the second area 720 while extending the coverage thereof to the first area 710.

In this example, deactivation of a channel implies that control is performed not to use the channel or the channel is not used. Specifically, deactivation of a channel may be understood as release of configuration of the channel, transition to a state in which the channel is not used while maintaining configuration of the channel, release of a resource allocated for the channel, or as an operation having a technical meaning similar thereto. Similarly, activation of a channel may be understood as establishment of configuration of the channel, transition to a state in which the channel can be used while maintaining configuration of the channel, allocation of a resource for the channel, or as an operation having a technical meaning similar thereto.

Figure 8:
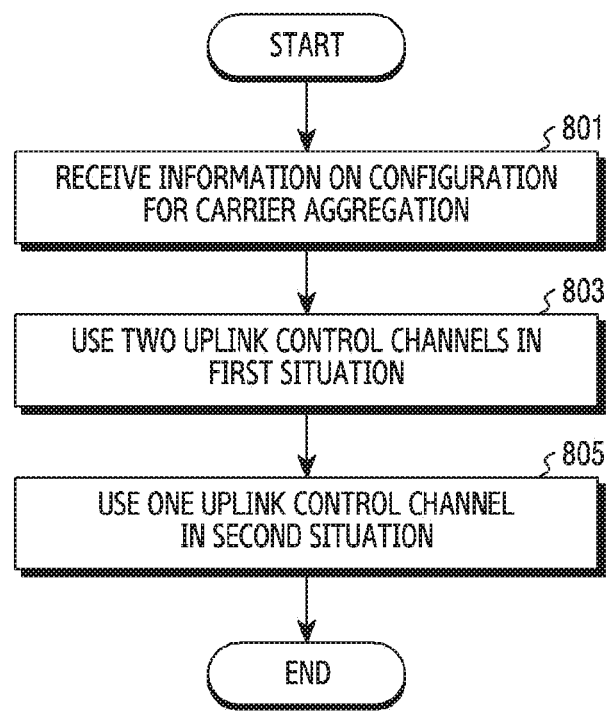
FIG. 8 is a flowchart illustrating an operation of a terminal that performs communication by using a carrier aggregation (CA) technique in a wireless communication system according to an embodiment of the disclosure.

FIG. 8 is a flowchart illustrating an operation of a terminal that performs communication by using a CA technique in a wireless communication system according to an embodiment of the disclosure.

FIG. 8 illustrates an example of an operating method of the terminal 120.

Referring to FIG. 8, in operation 801, the terminal receives information on a configuration for CA. For a CA operation, the terminal may receive, from a base station, information on a CA configuration, and may configure hardware and a resource (e.g., a time-frequency resource or identification information) according to the received information. The information on the CA configuration may include an indication of addition of a secondary cell, information on used carriers, and information on a channel in each carrier. For example, the information on the CA configuration may be received via a radio resource control (RRC) message. In an embodiment, it is assumed that two carriers are used for a CA operation.

In operation 803, the terminal uses two uplink control channels in a first situation. In other words, the terminal uses an uplink control channel for each carrier in the first situation. For example, the first situation may refer to a situation in which the terminal is located in a coverage of an uplink control channel in a second carrier having a frequency higher than that of a first carrier. Accordingly, the terminal may transmit, on the first carrier, ACK/NACK information for data received on the first carrier, and may transmit, on the second carrier, ACK/NACK information for data received on the second carrier.

In operation 805, the terminal uses one uplink control channel in a second situation. In other words, the terminal uses an uplink control channel shared between carriers in the second situation. For example, the second situation may refer to a situation in which the terminal is located outside a coverage of an uplink control channel in the second carrier having a frequency higher than that of the first carrier. Accordingly, the terminal may transmit, on the first carrier, ACK/NACK information for data received on the first carrier, and may transmit, on the first carrier, ACK/NACK information for data received on the second carrier.

Figure 9:
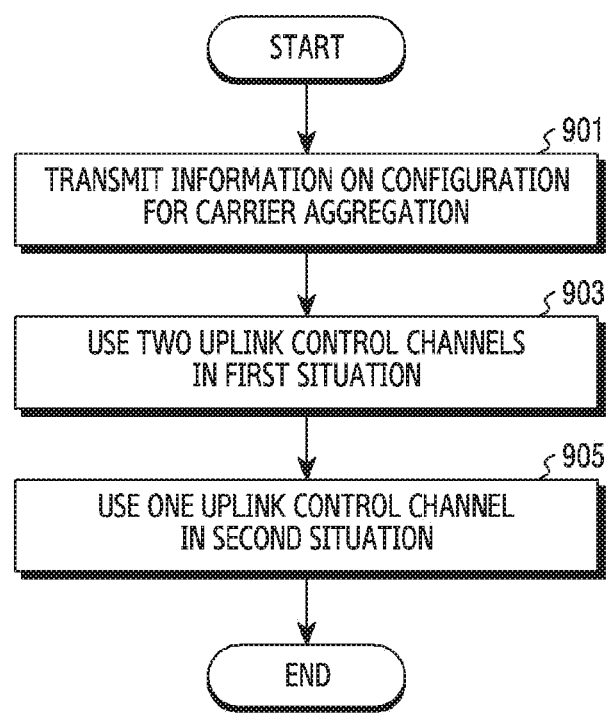
FIG. 9 is a flowchart illustrating an operation of a base station that performs communication by using a CA technique in a wireless communication system according to an embodiment of the disclosure.

FIG. 9 is a flowchart illustrating an operation of a base station that performs communication by using a CA technique in a wireless communication system according to an embodiment of the disclosure.

FIG. 9 illustrates an example of an operating method of the base station 110.

Referring to FIG. 9, in operation 901, the base station transmits information on a configuration for CA. For a CA operation, the base station may transmit, to a terminal, information on a CA configuration, and may configure hardware and a resource (e.g., a time-frequency resource or identification information) for the CA operation, according to the transmitted information. The information on the CA configuration may include an indication of addition of a secondary cell, information on used carriers, and information on a channel in each carrier. For example, the information on the CA configuration may be transmitted via an RRC message. In an embodiment, it is assumed that two carriers are used for a CA operation.

In operation 903, the base station uses two uplink control channels in a first situation. In other words, the terminal uses an uplink control channel for each carrier in the first situation. For example, the first situation may refer to a situation in which the terminal is located in a coverage of an uplink control channel in a second carrier having a frequency higher than that of a first carrier. Accordingly, the base station may receive, on the first carrier, ACK/NACK information for data transmitted on the first carrier, and may receive, on the second carrier, ACK/NACK information for data transmitted on the second carrier.

In operation 905, the base station uses one uplink control channel in a second situation. In other words, the terminal uses an uplink control channel shared between carriers in the second situation. For example, the second situation may refer to a situation in which the terminal is located outside a coverage of an uplink control channel in the second carrier having a frequency higher than that of the first carrier. Accordingly, the base station may receive, on the first carrier, ACK/NACK information for data transmitted on the first carrier, and may receive, on the first carrier, ACK/NACK information for data transmitted on the second carrier.

In the embodiments described with reference to FIGS. 8 and 9, an example of use of two carriers is described. However, even when a CA operation using at least three carriers is performed, the operations as illustrated in FIGS. 8 and 9 may be performed. That is, for two carriers among the at least three carriers, the operations as illustrated in FIGS. 8 and 9 may be performed. In other words, among the at least three carriers, one carrier having a regularly-activated uplink control channel and at least another carrier having a selectively-activated uplink control channel may be construed to be one pair or group, and under this configuration, the base station and the terminal may perform the above-described operations. For example, when a CA operation using carrier #1, carrier #2, carrier #3, and carrier #4 is performed, the above-described operations may be performed for carrier #1 and carrier #2, and the above-described operations may be performed for carrier #3 and carrier #4. In addition, the above-described operations may be performed together for carrier #1 and carrier #3. That is, the embodiments described with reference to FIGS. 8 and 9 may be easily extended to the CA operation using at least three carriers.

Figure 10:
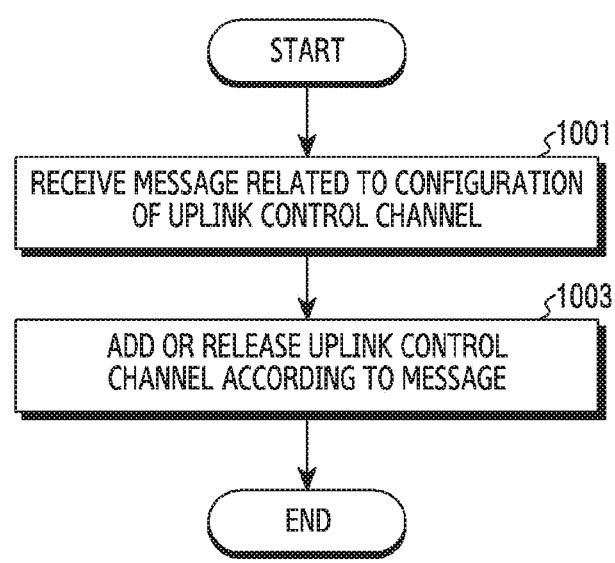
FIG. 10 is a flowchart illustrating an operation of a terminal that manages uplink control channels in a wireless communication system according to an embodiment of the disclosure.

FIG. 10 is a flowchart illustrating an operation of a terminal that manages uplink control channels in a wireless communication system according to an embodiment of the disclosure.

FIG. 10 illustrates an example of an operating method of the terminal 120.

Referring to FIG. 10, in operation 1001, the terminal receives a message related to a configuration of an uplink control channel. The message includes information for changing a configuration of an uplink control channel in a carrier belonging to a high-frequency range among carriers used for a CA operation. In this example, the message may be received on a first carrier or a second carrier. For example, the message may be an RRC message, a medium access control (MAC) control element (CE), or downlink control information (DCI).

In operation 1003, the terminal adds or releases an uplink control channel according to the message. The terminal changes a state of an uplink control channel in the second carrier according to an indication of the message. That is, when addition of an uplink control channel in the second carrier is indicated in a state in which an uplink control channel in the second carrier is deactivated, the terminal activates the uplink control channel in the second carrier. In contrast, when release of the uplink control channel in the second carrier is indicated in a state in which the uplink control channel in the second carrier is activated, the terminal deactivates the uplink control channel in the second carrier.

Figure 11:
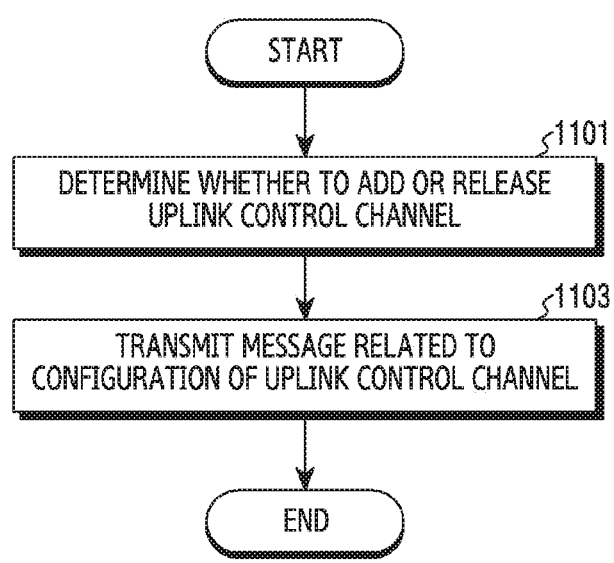
FIG. 11 is a flowchart illustrating an operation of a base station that controls uplink control channels in a wireless communication system according to an embodiment of the disclosure.

FIG. 11 is a flowchart illustrating an operation of a base station that controls uplink control channels in a wireless communication system according to an embodiment of the disclosure.

FIG. 11 illustrates an example of an operating method of the base station 110.

Referring to FIG. 11, in operation 1101, the base station determines whether to add or release an uplink control channel. In a state in which an uplink control channel in a second carrier is deactivated, the base station may determine that an uplink control channel in the second carrier is to be added. Alternatively, in a state in which the uplink control channel in the second carrier is activated, the base station may determine that the uplink control channel in the second carrier is to be released. According to various embodiments, the base station may determine whether a state of the uplink control channel in the second carrier has been changed, based on at least one of a location of a terminal and channel quality.

In operation 1103, the base station transmits a message related to a configuration of an uplink control channel. The message includes information for changing a configuration of an uplink control channel in a carrier belonging to a high-frequency range among carriers used for a CA operation. In this example, the message may be transmitted on a first carrier or the second carrier. For example, the message may be an RRC message, a MAC CE, or DCI.

In the embodiments described with reference to FIGS. 10 and 11, the base station and the terminal transmit and receive messages for activation/deactivation of an uplink control channel in the second carrier. In this example, the message may be an RRC message, a MAC CE, or DCI.

According to an embodiment, a message is an RRC message, and may include information on mapping of a resource of an uplink control channel corresponding to downlink data of the second carrier. For example, the RRC message may include a parameter named "PUCCH-config". PUCCH-config may include at least one piece of information among: information on addition or release of a resource or a resource set of an uplink control channel in the second carrier; information on a format; or information on a corresponding downlink data channel. For example, the RRC message may indicate mapping of a resource of an uplink control channel corresponding to downlink data of the second carrier, and the indicated resource may be a resource of the first carrier or a resource of the second carrier.

According to another embodiment, a message is an RRC message, and may include at least one parameter defined for the purpose of indicating activation/deactivation of an uplink control channel as described above. For example, the RRC message may include at least one of: an indicator for indicating switching of a state of an uplink control channel in the second carrier; or information indicating a carrier to which another uplink control channel, which is to be alternatively used when an uplink control channel is deactivated, belongs.

Figure 12:
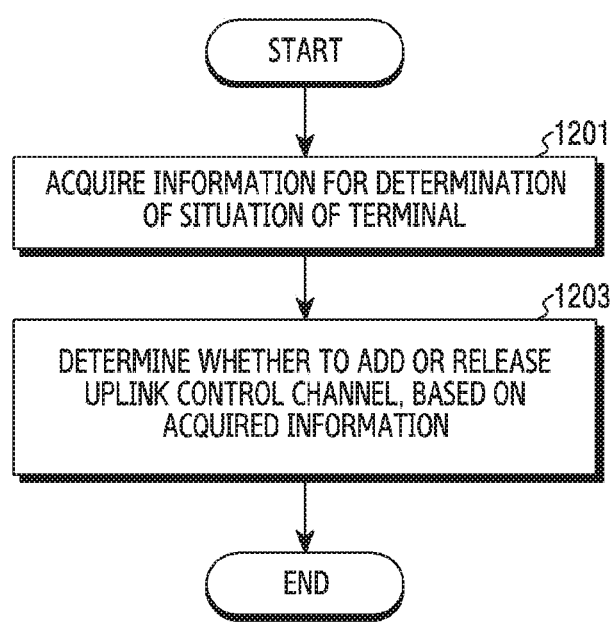
FIG. 12 is a flowchart illustrating an operation of a base station that determines switching of a state of an uplink control channel in a wireless communication system according to an embodiment of the disclosure.

FIG. 12 is a flowchart illustrating an operation of a base station that determines switching of a state of an uplink control channel in a wireless communication system according to an embodiment of the disclosure.

FIG. 12 illustrates an example of an operating method of the base station 110.

Referring to FIG. 12, in operation 1201, the base station acquires information for determination of a situation of a terminal. The information includes at least one of measurement information reported by the terminal, a transmission rate of an uplink channel, an error rate of uplink information, or location estimation information of the terminal.

In operation 1203, the base station determines whether to add or release an uplink control channel, based on the acquired information. The base station may determine whether the terminal is located in a coverage of an uplink control channel in a second carrier having a frequency higher than that of a first carrier, based on the acquired information, and may determine whether to switch a state of the uplink control channel in the second carrier, based on whether the terminal is located in the coverage of the uplink control channel in the second carrier. For example, if it is determined that the terminal is not located in the coverage of the uplink control channel in the second carrier in a state in which the uplink control channel in the second carrier is activated, the base station may determine that the uplink control channel is to be released. If it is determined that the terminal is located in the coverage of the uplink control channel in the second carrier in a state in which the uplink control channel in the second carrier is deactivated, the base station may determine that an uplink control channel is to be added.

In the embodiment described with reference to FIG. 12, the base station acquires information for determination of whether to switch a state of the uplink control channel in the second carrier. In this example, respective pieces of the used information may be different according to various embodiments. For example, the information may include information for determination of an electric field strength or information for estimation of a location.

In the present disclosure, embodiments according to schemes of operating PUCCH channel(s) (hereinafter, an adaptive PUCCH operating technique) have been described based on the CA situation of FR1 and FR2, but the embodiments of the present disclosure are not interpreted as being specified only in this situation. That is, if the different numerologies are used in two cells, the adaptive PUCCH operation technique according to the examples of the present disclosure can be applied in any case. In some embodiments, the adaptive PUCCH operation technique of the present disclosure may be applied in a CA case having different numerology even in the same frequency range. Furthermore, in some embodiments, the adaptive PUCCH operation technique of the present disclosure may be applied in dual connectivity (DC) of FR1-FR2. Furthermore, in some embodiments, the adaptive PUCCH operation technique can be applied base the number of HARQ processes (for example, the configured number of HARQ processes or the maximum number of HARQ processes).

According to an embodiment, a measurement report from the terminal may be used as the information. The terminal may measure channel quality (e.g., reference signal received power (RSRP) or reference signal received quality (RSRQ)) by using a transmission side signal (e.g., a reference signal (RS) or a synchronization signal) of the base station, and may report the measured channel quality to the base station. The base station may determine an electric field strength by using the reported measurement information. When the electric field strength exceeds a threshold, the base station may determine that the terminal is located within an uplink control channel in the second carrier.

According to an embodiment, a data transmission rate of an uplink data channel may be used as the information. After the terminal receives uplink data on the second carrier, the base station performs demodulation and decoding. Accordingly, the base station may identify an uplink data transmission rate. A high uplink data transmission rate implies that an electric field is good. Accordingly, when the uplink data transmission rate exceeds a threshold, the base station may determine that the terminal is located within an uplink control channel in the second carrier.

According to an embodiment, a detection error rate of uplink control information (UCI) may be used as the information. The terminal may transmit uplink control information via an uplink control channel, and the base station may detect the uplink control information. The base station may determine success or failure of the detection, and thus may identify a detection error rate of the uplink control information. A low detection error rate implies that an electric field is good. Accordingly, when the detection error rate of the uplink control information is less than a threshold, the base station may determine that the terminal is located within an uplink control channel in the second carrier.

According to an embodiment, location information of the terminal may be used as the information. For example, the terminal may estimate a location thereof (e.g., by using a global positioning system (GPS)), and may transmit information on the estimated location to the base station. Accordingly, the base station may identify the location of the terminal or a distance between the base station and the terminal, and thus may determine whether the terminal is located within an uplink control channel in the second carrier.

According to an embodiment, information which can be used to estimate a location of the terminal may be used as the information. For example, when a location within a building is to be estimated, information related to communication, which is based on another radio access technology (RAT) (e.g., a wireless local area network (LAN)) which is not RAT for communication with the base station, may be used to estimate a location of the terminal. For example, the information which can be used to estimate the location of the terminal may include a wireless LAN access point (AP) located near the terminal (e.g., which is available via search) or identification information of a channel. In this example, the base station may identify an AP corresponding to the acquired identification information based on pre-stored AP-specific location information, and may then estimate a location of the terminal based on the location of the AP. Accordingly, the base station may identify the location of the terminal or the distance between the base station and the terminal, and may determine whether the terminal is located within an uplink control channel in the second carrier.

In the above-described determination operation which is based on an electric field strength at the terminal, the base station may make a determination based on an electric field strength of at least one of two carriers, that is, the first carrier belonging to a low-frequency range and the second carrier belonging to a high-frequency range. Since an object of the determination is whether the terminal is located in a coverage of the uplink control channel in the second carrier, an electric field of the second carrier may be used. In this regard, when a determination is made based on only the electric field strength of the second carrier, frequent signaling overhead for activation/deactivation of the uplink control channel may occur due to a temporary degradation of an electric field strength.

Therefore, the base station may further consider an electric field strength of the first carrier so as to determine whether an electric field strength is temporarily changed, and may then control the uplink control channel of the second carrier. For example, when an electric field strength of the second carrier and an electric field strength of the first carrier are both less than or equal to a threshold, the base station may determine that an electric field strength is not temporarily degraded. In contrast, when an electric field strength of the second carrier is less than or equal to the threshold but an electric field strength of the first carrier is greater than or equal to the threshold, the base station may determine that an electric field strength is temporarily degraded. In this example, a threshold for the first carrier may be different from a threshold for the second carrier.

In the above-described determination operation which is based on a location of the terminal, the base station may estimate a location of the terminal or a distance between the base station and the terminal based on an electric field strength of at least one of two carriers, that is, the first carrier belonging to a low-frequency range and the second carrier belonging to a high-frequency range. That is, the base station may determine whether to switch a state of an uplink control channel in the second carrier, based on at least one of measurement information on the first carrier, a data transmission rate, or control information error rate.

According to the above-described various embodiments, at least one of uplink control channels for the terminal that performs a CA operation may be selectively used according to a situation. In this example, uplink data channels may also be selectively used according to a situation. To this end, according to an embodiment, the base station does not allocate a resource for an uplink data channel which is to be deactivated, and thus may control such that an uplink data channel is not used in a corresponding carrier. That is, the base station may change a state of an uplink data channel via scheduling. According to another embodiment, the base station may transmit a message for transition of a state of an uplink data channel.

When a data channel is selectively used, the base station may deactivate an uplink data channel in the second carrier, and may control to transmit all uplink traffics via an uplink data channel in the first carrier. As an example, when the terminal requests allocation of an uplink resource to the second carrier and then an uplink data channel in the second carrier is deactivated before the allocation of the uplink resource, the base station may allocate, to the first carrier, the uplink resource corresponding to a corresponding request. In this example, control information for allocation of an uplink resource may include information which explicitly or implicitly notifies that an uplink resource is allocated to the first carrier at the request for allocation of an uplink resource to the second carrier.

While the disclosure has been shown and described with reference to certain various embodiments thereof, it will be understood by those skilled in the art that various changes in form and details may be made therein without departing from the spirit and scope of the disclosure as defined by the appended claims and their equivalents.

What is claimed is:

1. A method performed by a terminal in a wireless communication system, the method comprising:
   receiving, from a base station, configuration information for a first cell within a frequency range 1 (FR1) and a second cell within a frequency range 2 (FR2) higher than the FR1, wherein a slot length for the first cell is longer than a slot length for the second cell;

identifying whether a second physical uplink control channel (PUCCH) associated with the second cell within the FR2 is configured to transmit uplink control information for the second cell or not;

in response to determining that the second PUCCH is configured, transmitting first uplink control information for the first cell on a first PUCCH associated with the first cell and transmitting second uplink control information for the second cell on the second PUCCH; and in response to determining that the second PUCCH is not configured, transmitting the first uplink control information and the second uplink control information on the first PUCCH.

2. The method of claim 1,
wherein the FR1 provides a first subcarrier spacing being 15 kilohertz (kHz) or 30 kHz, and
wherein the FR2 provides a second subcarrier spacing being 60 kHz or 120 kHz.

3. The method of claim 1,
wherein the first uplink control information comprises hybrid automatic repeat request-acknowledge (HARQ-ACK) feedback for first data on the first cell, and
wherein the second uplink control information comprises HARQ-ACK feedback for second data on the second cell.

4. The method of claim 1, further comprising:
transmitting, to the base station, a signal for notifying that the second PUCCH is unavailable based on a number of hybrid automatic repeat request (HARQ) process configured to the UE and a difference between a first numerology for the first cell and a second numerology for the second cell.

5. The method of claim 1, further comprising:
receiving, from the base station, a medium access control (MAC) control element (CE) for activation or deactivation of the second PUCCH associated with the second cell.

6. The method of claim 1, further comprising:
receiving, from the base station, a radio resource control (RRC) message for indicating whether the second PUCCH associated with the second cell is used to transmit the uplink control information for the second cell or not.

7. The method of claim 1, wherein the second PUCCH associated with the second cell is configured based on at least one of a measurement report, an uplink data transmission rate, or an error rate of uplink control information, or a distance between the base station and the terminal.

8. The method of claim 1,
wherein, in response to determining that the terminal is within a coverage provided by the second PUCCH, the second PUCCH is configured, and
wherein, in response to determining that the terminal is not within the coverage provided by the second PUCCH, the second PUCCH is not configured.

9. A terminal in a wireless communication system, the terminal comprising:
at least one transceiver; and
at least one processor coupled to the at least one transceiver, configured to:
control the at least one transceiver to receive, from a base station, configuration information for a first cell within a frequency range 1 (FR1) and a second cell within a frequency range 2 (FR2) higher than the FR1, wherein a slot length for the first cell is longer than a slot length for the second cell;

identify whether a second physical uplink control channel (PUCCH) associated with the second cell within the FR2 is configured to transmit uplink control information for the second cell or not;

in response to determining that the second PUCCH is configured, control the at least one transceiver to transmit first uplink control information for the first cell on a first PUCCH associated with the first cell and control the at least one transceiver to transmit second uplink control information for the second cell on the second PUCCH; and in response to determining that the second PUCCH is not configured, control the at least one transceiver to transmit the first uplink control information and the second uplink control information on the first PUCCH.

10. The terminal of claim 9,
wherein the FR1 provides a first subcarrier spacing being 15 kilohertz (kHz) or 30 kHz, and
wherein the FR2 provides a second subcarrier spacing being 60 kHz or 120 kHz.

11. The terminal of claim 10, wherein the at least one processor is further configured to:
control the at least one transceiver to receive, from the base station, a medium access control (MAC) control element (CE) for activation or deactivation of the second PUCCH associated with the second cell.

12. The terminal of claim 9,
wherein the first uplink control information comprises hybrid automatic repeat request-acknowledge (HARQ-ACK) feedback for first data on the first cell, and
wherein the second uplink control information comprises HARQ-ACK feedback for second data on the second cell.

13. The terminal of claim 9, wherein the at least one processor is further configured to:
control the at least one transceiver to transmit, to the base station, a signal for notifying that the second PUCCH is unavailable based on a number of hybrid automatic repeat request (HARQ) process configured to the UE and a difference between a first numerology for the first cell and a second numerology for the second cell.

14. The terminal of claim 9, wherein the at least one processor is further configured to:
control the at least one transceiver to receive, from the base station, a radio resource control (RRC) message for indicating whether the second PUCCH associated with the second cell is used to transmit the uplink control information for the second cell or not.

15. The terminal of claim 9, wherein the second PUCCH associated with the second cell is configured based on at least one of a measurement report, an uplink data transmission rate, or an error rate of uplink control information, or a distance between the base station and the terminal.

16. The terminal of claim 9,
wherein, in response to determining that the terminal is within a coverage provided by the second PUCCH, the second PUCCH is configured, and
wherein, in response to determining that the terminal is not within the coverage provided by the second PUCCH, the second PUCCH is not configured.

17. A base station in a wireless communication system, the base station comprising:
- at least one transceiver; and
- at least one processor coupled to the at least one transceiver, configured to:
- control the at least one transceiver to transmit, to a terminal, configuration information for a first cell within a frequency range 1 (FR1) and a second cell within a frequency range 2 (FR2) higher than the FR1, wherein a slot length for the first cell is longer than a slot length for the second cell; and
- determine whether to configure a second physical uplink control channel (PUCCH) associated with the second cell within the FR2 to transmit uplink control information for the second cell or not;
- in response to determining that the second PUCCH is configured, control the at least one transceiver to receive first uplink control information for the first cell on a first PUCCH associated with the first cell and control the at least one transceiver to receive second uplink control information for the second cell on the second PUCCH; and
- in response to determining that the second PUCCH is not configured, control the at least one transceiver to receive the first uplink control information and the second uplink control information on the first PUCCH.

18. The base station of claim 17,
wherein the FR1 provides a first subcarrier spacing being 15 kilohertz (kHz) or 30 kHz, and
wherein the FR2 provides a second subcarrier spacing being 60 kHz or 120 kHz.

19. The base station of claim 18,
wherein the first uplink control information comprises hybrid automatic repeat request-acknowledge (HARQ-ACK) feedback for first data on the first cell, and
wherein the second uplink control information comprises HARQ-ACK feedback for second data on the second cell.

20. The base station of claim 18, wherein the at least one processor is further configured to:
control the at least one transceiver to transmit, to the terminal, a medium access control (MAC) control element (CE) for activation or deactivation of the second PUCCH associated with the second cell.

21. The base station of claim 17, wherein the at least one processor is further configured to:
control the at least one transceiver to transmit, to the terminal, a radio resource control (RRC) message for indicating whether the second PUCCH associated with the second cell is used to transmit the uplink control information for the second cell or not.

22. The base station of claim 17, wherein whether to configure the second PUCCH associated with the second cell is determined based on at least one of a measurement report, an uplink data transmission rate, or an error rate of uplink control information, or a distance between the base station and the terminal.

23. The base station of claim 17,
wherein, in response to determining that the terminal is within a coverage provided by the second PUCCH, the second PUCCH is configured, and
wherein, in response to determining that the terminal is not within the coverage provided by the second PUCCH, the second PUCCH is not configured.

* * * * *